(12) United States Patent
Lee et al.

(10) Patent No.: US 9,126,565 B2
(45) Date of Patent: Sep. 8, 2015

(54) RETRACTOR FOR SEAT BELT

(75) Inventors: Kyung Sang Lee, Anyang-si (KR); Doo Yong Kim, Ansan-si (KR); Kwang Mo Koo, Hwaseong-si (KR); Hyun Jin Yang, Hwaseong-si (KR)

(73) Assignee: Wooshin Safety Systems Co., Ltd., Hwaseong-si, Gyeonggi-do (KR)

( * ) Notice: Subject to any disclaimer, the term of this patent is extended or adjusted under 35 U.S.C. 154(b) by 319 days.

(21) Appl. No.: 13/699,294

(22) PCT Filed: May 4, 2011

(86) PCT No.: PCT/KR2011/003342
§ 371 (c)(1),
(2), (4) Date: Feb. 4, 2013

(87) PCT Pub. No.: WO2011/149201
PCT Pub. Date: Dec. 1, 2011

(65) Prior Publication Data
US 2013/0146698 A1   Jun. 13, 2013

(30) Foreign Application Priority Data

May 25, 2010   (KR) .................. 10-2010-0048717

(51) Int. Cl.
| B60R 22/36 | (2006.01) |
| B60R 22/40 | (2006.01) |
| B60R 22/405 | (2006.01) |
| B60R 22/35 | (2006.01) |
| B60R 22/41 | (2006.01) |
| B60R 22/415 | (2006.01) |

(52) U.S. Cl.
CPC ............... B60R 22/35 (2013.01); B60R 22/41 (2013.01); B60R 22/415 (2013.01)

(58) Field of Classification Search
CPC combination set(s) only.
See application file for complete search history.

(56) References Cited

U.S. PATENT DOCUMENTS

| 5,938,138 A * | 8/1999 | Sumiyashiki ............. 242/382.2 |
| 6,283,553 B1 | 9/2001 | Anderson et al. |
| 2006/0012237 A1 | 1/2006 | Delventhal et al. |

FOREIGN PATENT DOCUMENTS

| JP | 11-291865 A | 10/1999 |
| KR | 10-0248839 B1 | 12/1999 |
| KR | 10-2005-0007077 A | 1/2005 |

OTHER PUBLICATIONS

Notice of Allowance for Korean Counterpart Patent Application No. 10-2010-0048717 with English translation, 4 pgs. (May 16, 2013).
PCT International Search Report for PCT Counterpart Application No. PCT/KR2011/003342 containing Communication relating to the Results of the International Search Report, 3 pages, (Feb. 6, 2012).

* cited by examiner

Primary Examiner — Emmanuel M Marcelo
Assistant Examiner — Angela Caligiuri
(74) Attorney, Agent, or Firm — Blakely, Sokoloff, Taylor & Zafman LLP (57) ABSTRACT

Disclosed is a retractor for a seat belt including a spool around which a webbing is wound, a frame rotatably coupled with the spool, a flywheel gear provided at a central portion thereof with a driving gear, having one-directional gear teeth formed along an outer circumferential surface thereof, and mounted on one end of the spool, a vehicle sensor locked with the one-directional gear teeth if the frame is inclined at a predetermined angle or more, a lever locked with the one-directional gear teeth if the webbing is withdrawn by a predetermined first length, and separated from the one-directional teeth if the webbing is introduced again so that the webbing is withdrawn by the second length, and an integrated plate including a driven gear, a first plate to adjust the lever according to a withdrawn length of the webbing, and a second plate integrated with the first plate.

16 Claims, 4 Drawing Sheets

RETRACTOR FOR SEAT BELT

CROSS-REFERENCE TO RELATED APPLICATIONS

This patent application is a U.S. National Phase Application under 35 U.S.C. §371 of International Application No. PCT/KR2011/003342, filed May 4, 2011, entitled RETRACTOR FOR SEAT BELT, which claims priority to Korean Patent Application No. 10-2010-0048717, filed May 25, 2010.

FIELD

The present invention relates to a retractor for a seat belt. More particularly, the present invention relates to a retractor for a seat belt, capable of realizing both of an ALR (Automatic Locking Retractor) function and a BO (Block Out) function.

BACKGROUND

In order to prevent an occupant in a vehicle or a machine from being ejected from a vehicle or a machine due to a collision between vehicles or a collision with another object, vehicles or machines are provided therein with various safety devices.

Among them, a seat belt is a typical device. The seat belt is safely fixed on the lower belly or the chest of the occupant in the vehicle or the machine. However, if a collision between vehicles or a collision with another object is significant, the seat belt may not act. Accordingly, the safety of the occupant in the vehicle or the machine may be compromised.

Accordingly, various technologies have been developed so that the function of the seat belt is properly performed even when a significant collision between vehicles or a significant collision with another object occurs. Among such technology, a retractor has attracted public attention.

Recently, retractors are designed with one of the ALR function or the BO function.

According to the ALR function, if a user withdraws a webbing by a predetermined length, the webbing is not withdrawn from the retractor any more, but is only introduced into the retractor like a method of installing and restraining a child seat into a vehicle seat or a machine seat. In addition, according to the BO function, a user can stop the operation of a sensor of detecting the inclination of a vehicle body to prevent the webbing from being withdrawn if the vehicle body is inclined at more than a predetermined angle, so that the webbing is only introduced into the retractor.

However, since the ALR function and the BO function are realized by using different components, both of the ALR function and the BO function cannot be realized inside one retractor.

In addition, even if both of the functions are realized in one retractor, the number of processes to manufacture the retractor may be increased. Furthermore, when both of the functions are realized, the number of parts may be increased as compared with a case in which only one function is realized.

SUMMARY

Accordingly, the present invention has been made to solve the above-mentioned problems occurring in the prior art, and an object of the present invention is to provide a retractor for a seat belt equipped with both of an automatic locking retractor function and a block out function.

The technical object of the present invention is not limited to the above object, and other objects of the present invention will be clearly comprehended based on the following description by those skilled in the art.

In order to accomplish the above objects, there is provided a retractor for a seat belt. The retractor includes a spool around which a webbing is wound, a frame rotatably coupled with the spool and receiving the webbing wound around the spool, a flywheel gear provided at a central portion thereof with a driving gear having an axis identical to a rotational axis of the spool, having one-directional gear teeth formed along an outer circumferential surface thereof, and mounted on one end of the spool to rotate together with the spool, a vehicle sensor locked with the one-directional gear teeth if the frame is inclined at a predetermined angle or more to prevent the webbing from being withdrawn, a lever locked with the one-directional gear teeth to prevent the webbing from being withdrawn while allowing the webbing to be introduced if the webbing has been withdrawn by a predetermined first length, and separated from the one-directional teeth to allow the webbing to be withdrawn and introduced if the webbing is introduced again so that the webbing is withdrawn by a predetermined second length after the webbing has been withdrawn by the first length, and an integrated plate including a driven gear operating together with the driving gear of the flywheel gear to rotate together with the spool and the flywheel gear, a first plate adjusting the lever according to a withdrawn length of the webbing, and a second plate integrated with the first plate as a step structure to determine an operation of the vehicle sensor.

Preferably, the first plate has a first outer circumferential surface making contact with the lever when the webbing is introduced again after the webbing has been withdrawn by the first length, and a second outer circumferential surface making contact with the lever when the webbing is introduced again after the webbing has been withdrawn by the second length. The first and second outer circumferential surfaces have radiuses different from each other. And the first plate changes a position of the lever while rotating, so that the lever is locked with the one-directional gear teeth or separated from the one-directional gear teeth.

In this case, the radius of the second outer circumferential surface is greater than the radius of the first outer circumferential surface, the lever is locked with the one-directional gear teeth if the lever makes contact with the first outer circumferential surface, and the lever is pushed outward from the flywheel gear if the first plate rotates to allow the second circumferential surface to make contact with the lever, so that the lever is separated from the one-directional gear teeth.

In addition, the webbing is withdrawn by the first length when the lever is positioned at one side to connect the first outer circumferential surface with the second outer circumferential surface. The webbing is withdrawn by the second length when the lever is positioned at an opposite side to connect the first outer circumferential surface with the second outer circumferential surface.

In addition, the first length of the webbing is a length when the webbing is completely withdrawn from the frame.

In addition, the integrated plate further includes a reference point provided in the flywheel gear or a case surrounding the flywheel gear, so that the lever is positioned at the one side to connect the first outer circumferential surface with the second outer circumferential surface when the first length of the webbing is a length when the webbing is completely withdrawn from the frame.

Further, the second plate includes third and fourth outer circumferential surfaces making contact with the vehicle sensor, the third outer circumferential surface allows the vehicle sensor to be locked with the one-directional gear teeth to prevent the webbing from being withdrawn from the frame when the frame is inclined at the predetermined angle or more, and the fourth outer circumferential surface prevents the vehicle sensor from being locked with the one-directional gear teeth to allow the webbing to be withdrawn from the frame regardless of the inclination angle of the frame when the webbing is introduced into the frame after the webbing has been withdrawn by a predetermined third length.

In addition, the fourth outer circumferential surface protrudes from the third outer circumferential surface to push the vehicle sensor making contact with the fourth outer circumferential surface outward from the flywheel gear so that the vehicle sensor is not locked with the one-directional gear teeth when the webbing is introduced into the frame after the webbing has been withdrawn by the predetermined third length.

Meanwhile, the retractor for the seat belt according to one embodiment of the present invention further includes a reduction gear having one side operating together with the driving gear of the flywheel gear and an opposite side operating together with the driven gear of the integrated plate to reduce a rotational ratio of the driven gear to the driving gear, so that a speed of revolution of the integrate plate is further reduced compared to the speed of revolution of the flywheel gear.

In this case, the driven gear of the integrated plate includes an internal gear which is provided in a vicinity of a center of rotation of the integrated plate in opposition to the first to fourth outer circumferential surfaces and engaged with the opposite side of the reduction gear having a number of teeth smaller than a number of teeth of the one side of the reduction gear to rotate.

Meanwhile, the lever includes a body adjacent to the flywheel gear and the integrated plate, a first protrusion part protruding from the body and making contact with the first plate, a second protrusion part spaced apart from the first protrusion while protruding from the body and locked with the one-direction gear teeth when the webbing is withdrawn by the first length, and a position fixing part preventing the second protrusion part from being separated from the one-direction gear teeth due to external force occurring when the webbing is introduced after the second protrusion part has been locked with the one-directional teeth.

In this case, the first protrusion part makes contact with the first outer circumferential surface of the first plate and the second protrusion part is locked with the one-directional gear teeth when the webbing is withdrawn by the first length, so that the webbing is not able to be withdrawn, and the first protrusion part makes contact with the second outer circumferential surface of the first plate and the second protrusion part is separated from the one-directional gear teeth when the webbing is introduced again after the webbing has been withdrawn by the first length and the webbing is withdrawn by the second length, so that the webbing is able to be withdrawn again.

In addition, the position fixing part forms a latch locked with a protrusion provided on the case surrounding the flywheel gear or the frame, and the latch is locked with the protrusion after the second protrusion part has been locked with the one-directional gear teeth to prevent the second protrusion part from being separated from the one-directional gear teeth due to external force occurring when the webbing is introduced.

In addition, the position fixing part forms an elastic member having one side connected with the frame or the case surrounding the flywheel gear and an opposite side connected with the first protrusion part or the second protrusion part, and the elastic member applies elastic force to allow the second protrusion part to be directed toward the one-directional gear teeth to prevent the second protrusion part from being separated from the one-directional gear teeth.

In addition, the lever further comprises a third protrusion part protruding from the body to prevent the first protrusion part from being separated from the first plate due to the elastic member.

Further, the frame or the case surrounding the flywheel gear is provided therein with a guide part to guide the second protrusion part to move toward the one-directional gear teeth or move away from the one-directional gear teeth.

As described above, according to the retractor for the seat belt of the present invention, both of the automatic locking retractor function and a block out function can be realized.

As described above, both of the automatic locking retractor function and the BO block out function are realized, so that the number of the manufacturing processes and the number of the parts can be reduced. In addition, as the number of the parts is reduced, noise occurring between the parts can be reduced. As a result, when a device having specific functions integrated with each other is invented, accompanying effects can be obtained.

DETAILED DESCRIPTION

Hereinafter, exemplary embodiments of the present invention will be described with reference to accompanying drawings in detail. In the following description, generally well known functions or structures will be omitted in order to make the subject matter of the present invention clear.

Hereinafter, the structure of a retractor for a seat belt according to one embodiment of the present invention will be described with reference to FIGS. 1 to 5, and FIG. 11.

Figure 1:
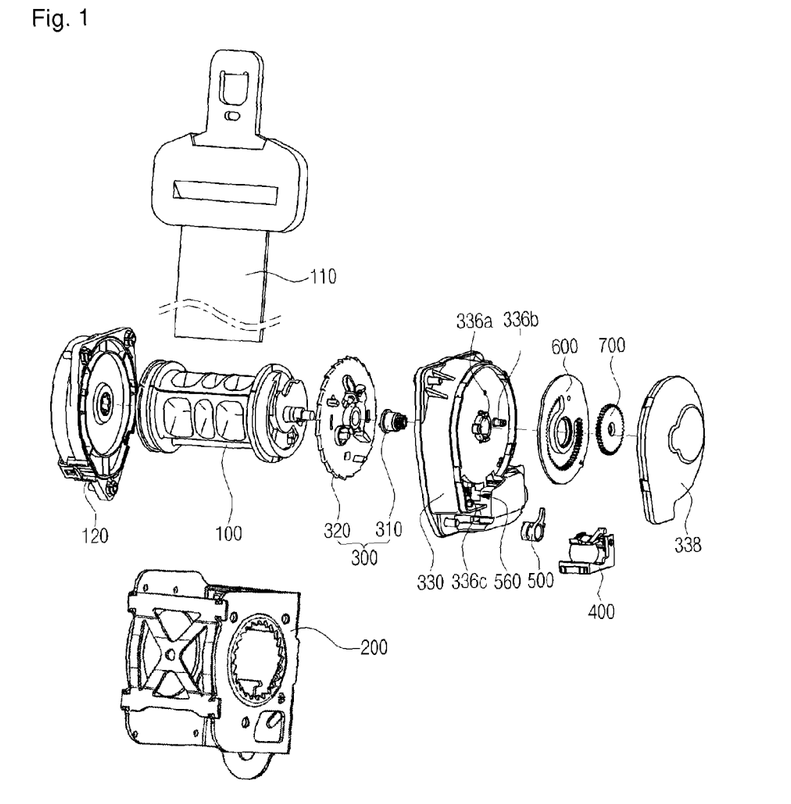
FIG. 1 is an exploded perspective view showing components of a retractor for a seat belt according to one embodiment of the present invention.
Figure 2:
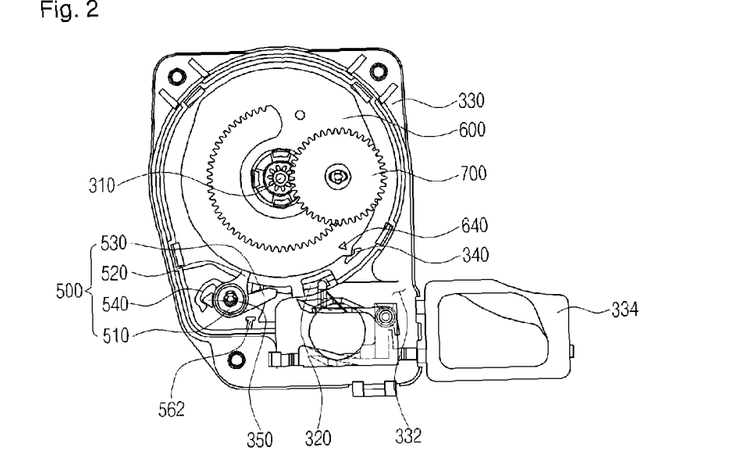
FIG. 2 is a plan view showing the retractor for the seat belt according to one embodiment of the present invention except for a case surrounding a flywheel gear.
Figure 3:
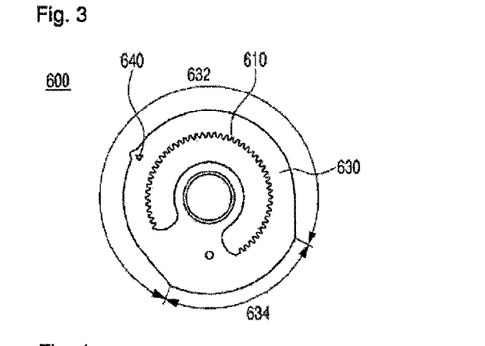
FIG. 3 is a plan view showing an integrated plate in the retractor for the seat belt according to one embodiment of the present invention.
Figure 4:
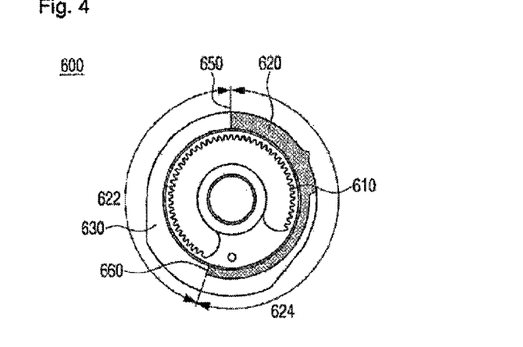
FIG. 4 is a bottom view showing the integrated plate in the retractor for the seat belt according to one embodiment of the present invention.
Figure 5:
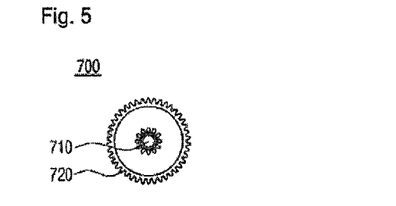
FIG. 5 is a bottom view showing a reduction gear in the retractor for the seat belt according to one embodiment of the present invention.
Figure 11:
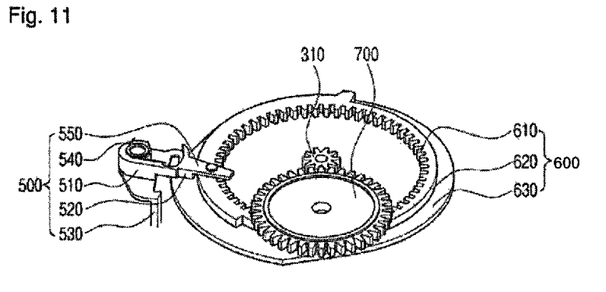
FIG. 11 is a partial perspective view showing the modifications of the integrated plate and a lever in the retractor for the seat belt according to one embodiment of the present invention.

FIG. 1 is an exploded perspective view showing components of a retractor for a seat belt according to one embodiment of the present invention, and FIG. 2 is a plan view showing the retractor for the seat belt according to one embodiment of the present invention except for a case surrounding a flywheel gear. FIG. 3 is a plan view showing an integrated plate in the retractor for the seat belt according to one embodiment of the present invention, and FIG. 4 is a bottom view showing the integrated plate in the retractor for the seat belt according to one embodiment of the present invention. FIG. 5 is a bottom view showing a reduction gear in the retractor for the seat belt according to one embodiment of the present invention. FIG. 11 is a partial perspective view showing the modification of the integrated plate and a lever in the retractor for the seat belt according to one embodiment of the present invention.

As shown in FIGS. 1 to 5, and FIG. 11, the retractor for the seat belt according to one embodiment of the present invention includes a spool 100, a frame 200, a flywheel gear 300, a vehicle sensor 400, a lever 500, and an integrated plate 600.

The spool 100 is a winder around which a webbing 110 is wound and has the shape of a cylinder. In this case, the webbing 110 is wound around the spool 100 in a direction in which the webbing 110 is introduced into a frame 200 to be described later by a return spring assembly 120.

The frame 200 receives the webbing 110 therein, and the spool 100 is rotatably coupled with an inner part of the frame 200. The frame 100 may be coupled with the return spring assembly 120 at one outer surface coupled with one end of the spool 100, and may be coupled with a case 330 surrounding the flywheel gear 300 to be described later at an opposite outer surface coupled with an opposite end of the spool 100. Meanwhile, a guide groove may be formed between the one outer surface and the opposite outer surface of the frame 200 to guide the webbing 110 such that the webbing 110 can be withdrawn only in one direction.

The flywheel gear 300 is coupled with the opposite end of the spool 100 such that the flywheel gear 300 can rotate together with the spool 100. In addition, the flywheel gear 300 determines the rotation of the spool 100 together with the vehicle sensor 400, the lever 500, and the integrated plate 600. In this case, the rotation of the spool 100 relates to the withdrawing or the introduction of the webbing 110 to be described later.

The flywheel gear 300 is provided at the central portion thereof with a driving gear 310 having an axis identical to a rotational axis of the spool 100, and provided with gear teeth 320 formed along the outer circumferential surface thereof.

The driving gear 310 may be coupled with the rotational axis protruding from the central portion of the opposite end of the spool 100. The driving gear 310 may be directly coupled with a driven gear 610 of the integrated plate 600 as described below, or may be indirectly coupled with a reduction gear 700. As the webbing 110 is withdrawn from the frame 200 or introduced into the frame 200, the driving gear 310 transfers the rotation of the spool 100 to the flywheel gear 300 and the integrated plate 600.

One-directional gear teeth 320 are not locked with the vehicle sensor 400 to be described later or the lever 500 in the direction in which the webbing 110 is introduced, but locked with the vehicle sensor 400 to be described later or the lever 500 in a direction in which the webbing 110 is withdrawn.

Meanwhile, the flywheel gear 300 having the above structure may be surrounded by the case 330. The flywheel gear 300 is provided to achieve various purposes including a purpose of preventing interference with the integrated plate 600 to be described later.

In more detail, as shown in FIG. 2, the case 330 may be provided therein with a receiving space 332 to receive the vehicle sensor 400 to be described later. In addition, the case 330 may include a cover 334 to prevent the vehicle sensor 400 from getting out of the receiving space 332. Meanwhile, as shown in FIG. 1, the case 330 may include various protrusions 336a, 336b, and 336c so that the lever 500, the integrated plate 600, and the reduction gear 700 are rotatably coupled with the case 330. In addition, the case 330 may include a cover 338 to prevent the lever 500, the integrated plate 600, and the reduction gear 700 from getting out of the case 330 after the lever 500, the integrated plate 600, and the reduction gear 700 have been rotatably coupled with the case 330.

The vehicle sensor 400 is locked with the one-directional gear teeth 320 to prevent the webbing 110 from being withdrawn from the frame 200 when the frame 200 is inclined at more than a predetermined angle. The vehicle sensor 400 may have various shapes only if the vehicle sensor 400 performs the above function. For example, the vehicle sensor 400 constituting the retractor for the seat belt according to one embodiment of the present invention may include a pressing part provided toward the one-directional gear teeth 320 and a weight which has a spherical shape and presses the pressing part when the frame 200 is inclined at more than a predetermined angle.

The lever 500 is used to realize an ALR (Automatic Locking Retractor) function to prevent the webbing 110 from being withdrawn when the webbing 110 has been withdrawn by a specific length. In other words, when the webbing 110 is withdrawn by a predetermined first length $l_1$ (see FIG. 6), the lever 500 is locked with the one-directional gear teeth 320 to prevent the webbing 110 from being withdrawn while allowing the webbing 110 to be introduced. When the webbing 110, which has been withdrawn by the first length $l_1$ (see FIG. 6), is introduced into the frame 200 so that the withdrawn length of the webbing 110 becomes a predetermined second length $l_2$ (see FIG. 6), the lever 500 is separated from the one-directional gear teeth 320 so that the webbing 110 can be introduced into the frame 200 or withdrawn from the frame 200.

The operation of the lever 500 is controlled by a first plate 620 of the integrated plate 600 which rotates together with the spool 100 and the flywheel gear 300 and is described later.

The lever 500 operating as described above may be configured through various schemes. However, in the retractor for the seat belt according to one embodiment of the present invention, the lever 500 may be configured through the following scheme.

For example, the lever 500 may include a body 510, a first protrusion part 520, a second protrusion part 530, and a position fixing part 540.

The body 510 is adjacent to the flywheel gear 300 and the integrated plate 600, and may be rotatably coupled with the case 330 surrounding the flywheel gear 300 or the frame 200. As described later, the first and second protrusion parts 520 and 530 protrude from the body 510, and the position fixing part 540 may be provided on the body 510.

The first protrusion part 520 protrudes from the body 510 to make contact with the first plate 620, and locks the second protrusion part 530 to the one-directional gear teeth 320 according to the withdrawn length of the webbing 110 through the adjustment by the first plate 620.

In other words, if the webbing 110, which has been withdrawn by a predetermined length, is introduced by the return spring assembly 120, the spool 100 around which the webbing 110 is wound may rotate. Simultaneously, the integrated plate 600 operating together with the spool 100 rotates. As the integrated plate 600 rotates as described above, the first plate 620 constituting the integrated plate 600 rotates to move the first protrusion part 520. As the first protrusion part 520 moves, the body 510 rotates, and the second protrusion part 530 protruding from the body 510 moves, so that the second protrusion part 530 is locked with the one-directional gear teeth 320.

Figure 6:
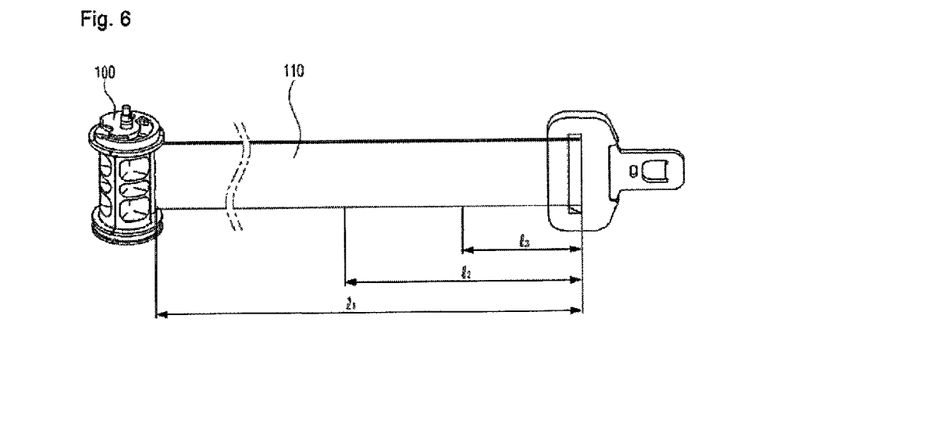
FIG. 6 is a perspective view partially showing the spool and the webbing in order to explain the operating procedure of the retractor for the seat belt according to one embodiment of the present invention.

The second protrusion part 530 protrudes from the body 510 while being spaced apart from the first protrusion part 520, and moves as described above so that the second protrusion part 530 is locked with the one-directional gear teeth 320 when the webbing 110 is withdrawn by the first length $l_1$ (see FIG. 6).

In more detail, if the webbing 110 is withdrawn by the first length $l_1$ (see FIG. 6), the first protrusion part 520 makes contact with a first outer circumferential surface 622 of the first plate 620 and the second protrusion part 530 is locked with the one-directional gear teeth 320, so that the webbing 110 cannot be withdrawn any more. In addition, if the webbing 110 is introduced into the frame 200 again so that the withdrawn length of the webbing 110 becomes the second length $l_2$ (see FIG. 6) after the webbing 110 has been withdrawn by the first length $l_1$ (see FIG. 6), the first protrusion part 520 makes contact with the second outer circumferential surface 624 of the first plate 620, and the second protrusion part 530 is separated from the one-directional gear teeth 320, so that the webbing 110 can be withdrawn from the frame 200 again.

The position fixing part 540 prevents the second protrusion part 530 from being separated from the one-directional gear teeth 320 due to an external force occurring when the webbing 110 is introduced after the second protrusion part 530 has been locked with the one-directional gear teeth 320.

In other words, although the one-directional gear teeth 320 are not locked with the vehicle sensor 400 or the lever 500 in the direction in which the webbing 110 is introduced as described above, the one-directional gear teeth 320 have a predetermined height due to the characteristic thereof. Accordingly, when the webbing 110 is introduced, external force such as impact or frictional force may occur due to the contact with the vehicle sensor or the lever 500. The external force may separate the second protrusion part 530 from the one-directional gear teeth 320. However, the position fixing part 540 prevents the second protrusion part 530 from being separated from the one-directional gear teeth 320.

The position fixing part 540 may have various structures only if the position fixing part 540 performs the above function. Hereinafter, cases in which the position fixing part 540 includes a latch or an elastic member will be described as an example.

In other words, as shown in FIG. 2, the position fixing part 540 may include a latch locked to a protrusion 350 provided in the case 330 surrounding the frame 200 or the flywheel gear 300. In other words, after the second protrusion part 530 has been locked to the one-directional gear teeth 320, the position fixing part 540 is locked with the protrusion 350, thereby preventing the second protrusion part 530 from being separated from the one-directional gear teeth 320 due to the external force occurring when the webbing 110 is introduced.

In addition, as shown in FIG. 11, the position fixing part 540 may include an elastic member having one side coupled with the case 330 surrounding the frame 200 or the flywheel gear 300 and an opposite side coupled with the first protrusion part 520 or the second protrusion part 530. In addition, the position fixing part 540 applies an elastic force so that the second protrusion part 530 is directed to the one-directional gear teeth 320. Accordingly, the second protrusion part 530 is prevented from being separated from the one-directional gear teeth 320 due to the elastic force occurring when the webbing 110 is introduced.

If the position fixing part 540 includes an elastic member as described above, the lever 500 may further include a third protrusion part 550 protruding from the body 510 so that the first protrusion part 520 is not separated from the first plate 620 due to the position fixing part 540. the third protrusion part 550 may be more necessary for the modification of the integrated plate 600 shown in FIG. 11 rather than the integrated plate 600 shown in FIGS. 1 to 5.

Meanwhile, regardless of whether the position fixing part 540 includes a latch or an elastic member, the case 330 surrounding the frame 200 or the flywheel gear 300 may include a guide part 560 to guide the second protrusion part 530 to move toward the one-directional gear teeth 320 or move away from the one-directional gear teth 320. The guide part 560 may include a locking step 562 to prevent the lever 500 from getting out of the movement range thereof as shown in FIG. 2.

The integrated plate 600 rotates together with the spool 100 and the flywheel gear 300, and adjusts the lever 500 and the vehicle sensor 400 according to the withdrawn length of the webbing 110. In other words, the integrated plate 600 allows the retractor for the seat belt according to one embodiment of the present invention to perform both of the ALR function and the BO function.

In particular, the integrated plate 600 is not separated from other components, but integrally assembled with other components to be described later. Accordingly, when both of the ALR function and the BO function are realized, the integrated plate 600 does not cause friction or noise with respect to other components.

The integrated plate 600 may include the driven gear 610, a first plate 620, and a second plate 630.

The driven gear 610 operates together with the driving gear 310 of the flywheel gear 300. In other words, the driven gear 610 allows the integrated plate 600 to rotate together with the flywheel gear 300 coupled with the spool 100.

The driven gear 610 may have various shapes or structures only if the driven gear 610 can operate together with the driving gear 310. For example, as shown in FIGS. 3 and 4 in detail, the driven gear 610 may be prepared as an internal gear arranged in the vicinity of the center of the rotation of the integrated plate 600 in opposition to first to fourth circumferential surfaces 622 to 634 to be described later.

In this case, the reduction gear 700 may be provided between the driving gear 310 and the driven gear 610. The reduction gear 700 reduces the rotational ratio of the driven gear 610 to the driving gear 310 to reduce the speed of the revolution of the integrated plate 600 rather than the speed of the revolution of the flywheel gear 300.

One side of the reduction gear 700 performing the function operates together with the driving gear 310, and an opposite side of the reduction gear 700 operates together with the driven gear 610. in this case, in order to reduce the rotational ratio of the driven gear 610 to the driving gear 310, the number of the teeth of the one side 720 of the reduction gear 700 operating with the driving gear 310 is greater than the number of the teeth of the opposite side 710 of the reduction gear 700 operating with the driven gear 610.

The first plate 620 includes the first and second outer circumferential surfaces 622 and 624 to control the lever 500 according to the withdrawn length of the webbing 110.

The first outer circumferential surface 622 makes contact with the lever 500 when the webbing 110 is introduced after the webbing 110 has been withdrawn by the first length $l_1$ (see FIG. 6), and the second outer circumferential surface 624 makes contact with the lever 500 when the webbing 110 is introduced after the webbing 110 has been withdrawn by the second length $l_2$ (see FIG. 6).

The first and second outer circumferential surfaces 622 and 624 have different radiuses, and rotate so that the position of the lever 500 is changed. Accordingly, the first and second outer circumferential surfaces 622 and 624 adjust the lever 500 so that the lever 500 is locked with the one-directional gear teeth 320 or separated from the one-directional gear teeth 320.

In more detail, the radius of the second outer circumferential surface 624 is greater than the radius of the first outer circumferential surface 622 so that the lever 500 can be adjusted. In other words, when the webbing 110 is introduced again after the webbing 110 has been withdrawn by the first length $l_1$ (see FIG. 6), the first protrusion part 520 of the lever 500 makes contact with the first outer circumferential surface 622, and the second protrusion part 530 of the lever 500 is locked with the one-directional gear teeth 320. However, when the webbing 110 is introduced so that the withdrawn length of the webbing 110 becomes the second length $l_2$ (see FIG. 6), the first protrusion part 520 of the lever 500 is pushed to the second outer circumferential surface 624 having a greater radius to make contact with the second outer circumferential surface 624. Accordingly, the body 510 of the lever 500 rotates. The rotation of the body 510 of the lever 500 moves the second protrusion part 530 of the lever 500, so that the second protrusion part 530 of the lever 500 is separated from the one-directional gear teeth 320.

The second plate 630 determines the operation of the vehicle sensor 400 according to the withdrawn length of the webbing 110. The second plate 630 is integrated with the first plate 620 in the form of a step. In other words, the second plate 630 may be prepared as a single injection-molded product that forms a step structure together with the first plate 620. In addition, the second plate 630 may be wider than the first plate 620.

The second plate 630 includes third and fourth outer circumferential surfaces 632 and 634 making contact with the vehicle sensor 400.

The third outer circumferential surface 632 of the second plate 630 makes contact with the vehicle sensor 400 when the frame 200 is inclined at a predetermined angle or more so that the vehicle sensor 400 prevents the webbing 110 from being withdrawn. The fourth outer circumferential surface 634 makes contact with the vehicle sensor 400 when the webbing 110 is withdrawn by a predetermined third length $l_3$ (see FIG. 6), so that the webbing 110 can be withdrawn regardless of the inclination angle of the frame 200, that is, when the vehicle sensor 400 does not operate.

In this case, the fourth outer circumferential surface 634 protrudes from the third outer circumferential surface 632 to push the vehicle sensor 400 outward from the flywheel gear 300 so that the vehicle sensor 400 is not locked with the one-directional gear teeth 320 when the webbing 110 is withdrawn by the third length $l_3$ (see FIG. 6).

In more detail, when the webbing 110 is withdrawn by a length longer than the third length $l_3$ (see FIG. 6) and is introduced until the withdrawn length of the webbing 110 approximates the third length $l_3$ (see FIG. 6), the vehicle sensor 400 makes contact with the third outer circumferential surface 632, and may be locked with the one-directional gear teeth 320 when the frame 200 is inclined at more than the predetermined angle. However, when the webbing 110 is withdrawn by the third length $l_3$ (see FIG. 6) and introduced, the vehicle sensor 400 makes contact with the fourth outer circumferential surface 634, the protruding fourth outer circumferential surface 634 pushes the vehicle sensor 400 outward from the flywheel gear 300 to prevent the vehicle sensor from being locked with the one-directional gear teeth 320. Accordingly, the webbing 110 can be freely introduced or withdrawn regardless of the inclination angle of the frame 200.

Meanwhile, in addition to the driven gear 610, and the first and second plates 620 and 630, the integrated plate 600 may further include a reference point 640.

The reference point 640 corresponds to a reference point 340 provided in the flywheel gear 300 or the case 330 surrounding the flywheel gear 300, and is used to place the lever 500 at one side 650 to connect the first and second outer circumferential surfaces 622 and 624 with each other when the completely-withdrawn length of the webbing 110 is the first length $l_1$ (see FIG. 6).

The reference point 640 may be marked in the shape of an arrow on one surface of the integrated plate 600, or may protrude from an outer circumferential surface of the second plate 630.

Hereinafter, the operating procedure of the retractor for the seat belt according to one embodiment of the present invention will be described with reference to FIGS. 6 to 10.

Figure 7:
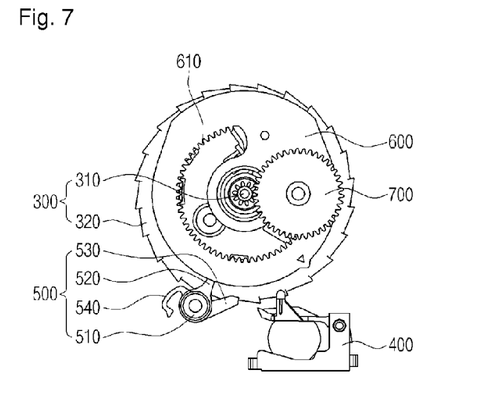
FIG. 7 is a plan view partially showing the retractor for the seat belt according to one embodiment of the present invention performing the ALR function.
Figure 8:
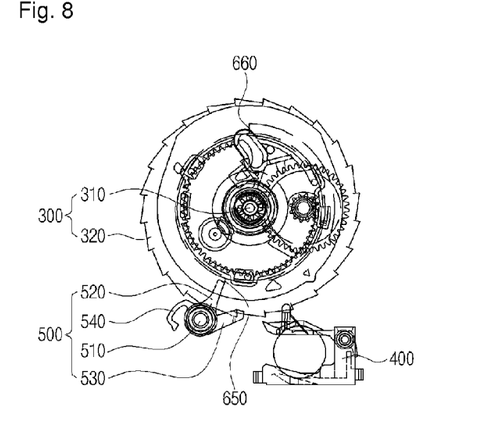
FIG. 8 is a bottom view partially showing the retractor for the seat belt according to one embodiment of the present invention performing the ALR function.
Figure 9:
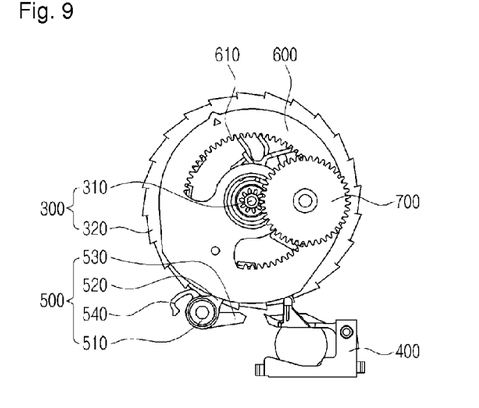
FIG. 9 is a plan view partially showing the retractor for the seat belt according to one embodiment of the present invention performing the BO function.
Figure 10:
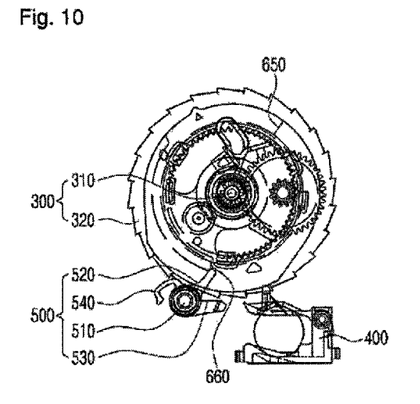
FIG. 10 is a bottom view partially showing the retractor for the seat belt according to one embodiment of the present invention performing the BO function.

FIG. 6 is a perspective view partially showing the spool and the webbing in order to explain the operating procedure of the retractor for the seat belt according to one embodiment of the present invention. FIG. 7 is a plan view partially showing the retractor for the seat belt according to one embodiment of the present invention performing the ALR function, and FIG. 8 is a bottom view partially showing the retractor for the seat belt according to one embodiment of the present invention performing the ALR function. FIG. 9 is a plan view partially showing the retractor for the seat belt according to one embodiment of the present invention performing the BO function, and FIG. 10 is a bottom view partially showing the retractor for the seat belt according to one embodiment of the present invention performing the BO function.

Hereinafter, the functions realized by the retractor for the seat belt according to one embodiment of the present invention depending on the withdrawn lengths of the webbing 110 will be described with reference to FIG. 6.

The webbing 110 is always introduced by the return spring assembly 120 so that the webbing 110 is wound around the spool 100. However, the webbing 110 may be withdrawn by a predetermined length according to the necessities of a user.

However, when the webbing 110 is withdrawn by the first length $l_1$, the first protrusion part 520 of the lever 500 makes contact with the first outer circumferential surface 622 of the first plate 620 of the integrated plate 600, and the second protrusion part 530 of the lever 500 is locked with the one-direction gear teeth 320 of the wheel gear 300. Therefore, if the webbing 110 is withdrawn by the first length $l_1$, the webbing 110 is not withdrawn any more, but only introduced.

The ALR function of the retractor for the seat belt according to one embodiment of the present invention can be realized by preventing the webbing 110 from being withdrawn from the frame 200 and allowing the introducing of the webbing 110 into the frame 200. In detail, when the webbing 110 is withdrawn by the first length $l_1$, it is regarded as a start point of the ALR function.

In other words, the realization of the ALR function is started when the lever 500 is placed at the side 650 to connect the first and second outer circumferential surfaces 622 and 624 with each other. In this case, the webbing 110 has been withdrawn by the first length $l_1$.

Meanwhile, the starting point of the realization of the ALR function can be adjusted according to the intention of the user. The starting point may be a point at which the webbing 110 is completely withdrawn from the frame 200 for the purpose of the convenience of the user to set the starting point. In other words, as shown in FIG. 6, the first length $l_1$ may be a length when the webbing 110 is completely withdrawn from the frame 200.

Thereafter, when the webbing 110 is continuously introduced into the frame 200 so that the withdrawn length of the webbing 110 becomes the second length $l_2$, the first protrusion part 520 of the lever 500 makes contact with the second outer circumferential surface 624 of the first plate 620 of the integrated plate 600, and the second protrusion part 530 of the lever 500 is separated from the one-directional gear teeth 320 of the flywheel gear 300. Therefore, when the webbing 110 is withdrawn by the second length $l_2$, the webbing 110 can be freely withdrawn from the frame 200 or introduced into the frame 200.

The ALR function of the retractor for the seat belt according to one embodiment of the present invention can be released by allowing the freely withdrawing and introducing of the webbing 110. In detail, when the webbing 110 is withdrawn by the second length $l_2$, it is regarded as an end point of the ALR function.

In other words, the realization of the ALR function may be finished when the lever 500 is placed at an opposite side 660 of the first plate 620 to connect the first and second outer circumferential surfaces 622 and 624 with each other. In this case, the webbing 110 is withdrawn by the second length $l_2$.

Meanwhile, regardless of the first length $l_1$ and the second length $l_2$ of the webbing 110, when the webbing 110 is withdrawn by the third length $l_3$ and introduced into the frame 200, the pressing part of the vehicle sensor 400 makes contact with the fourth outer circumferential surface 634 of the second plate 620 of the integrated plate 600, and the pressing part of the vehicle sensor 400 is separated from the one-directional gear teeth 320 of the wheel gear 300. Therefore, when the webbing 110 is introduced again after the webbing 110 has been withdrawn by the third length $l_3$, the vehicle sensor 400 does not operate regardless of the inclination angle of the frame 200, so that the webbing 110 can be freely withdrawn from the frame 200 or freely introduced into the frame 200.

In contrast, if the webbing 110 is withdrawn by a length longer than the third length $l_3$, the pressing part of the vehicle sensor 400 makes contact with the third outer circumferential surface 632 of the second plate 620 of the integrated plate 600. In addition, it is determined whether the pressing part of the vehicle sensor 400 is locked with the one-directional gear teeth 320 of the flywheel gear 300 according to the inclination angle of the frame 200.

The BO function of the retractor for the seat belt according to one embodiment of the present invention can be realized by preventing the withdrawing of the webbing 110 and allowing the introducing of the webbing 110. At this time, when the webbing 110 is withdrawn by the third length $l_3$, it is regarded as a reference point to realize the BO function.

In this case, the reference point to realize the BO function does not relate to the starting point and the finishing point to realize the ALR function. Accordingly, differently from FIG. 6, the third length $l_3$ of the webbing 110 may be longer than the second length $l_2$.

Meanwhile, since the retractor for the seat belt according to one embodiment of the present invention has the above structure, the ALR function and the BO function can be simultaneously realized. However, for the purpose of explanation, the ALR function and the BO function will be separately described below.

Hereinafter, the realization procedure of the ALR function in the retractor for the seat belt according to one embodiment of the present invention will be described with reference to FIGS. 7 and 8.

For example, in order to install and restrain a child seat in a seat of a vehicle or a machine, a user withdraws the webbing 110 by the first length $l_1$. In this case, as shown in FIGS. 7 and 8, the lever 500 is placed at one side 650 of the first plate 620 to connect the first outer circumferential surface 622 with the second outer circumferential surface 624.

Thereafter, the webbing 110 is started to be introduced into the frame 200 by the return spring assembly 120. However, the first protrusion part 520 of the lever 500 makes contact with the first outer circumferential surface 622 of the first plate 620 of the integrated plate 600, so that the second protrusion part 530 of the lever 500 is locked with the one-directional gear teeth 320 of the flywheel gear 300. Accordingly, the webbing 110 is not withdrawn.

Since the webbing 110 is only introduced and not withdrawn as described above, the ALR function is realized by using the retractor for the seat belt according to one embodiment of the present invention, so that the user can install and restrain the child seat in the seat of the vehicle or the machine.

Hereinafter, the realization procedure of the BO function in the retractor for the seat belt according to one embodiment of the present invention will be described with reference to FIGS. 9 and 10.

For example, when the retractor for the seat belt having the vehicle sensor is mounted on a seat back, the user may make the seat back close to a seat or make the seat back further away from the seat according to necessity. In this case, if the webbing is not withdrawn from the frame 200 any more by the vehicle sensor, the user may have a great difficulty when making the seat back further away from the seat again.

Accordingly, if the webbing, which has been withdrawn by the third length $l_3$, is introduced into the retractor for the seat belt according to one embodiment of the present invention, the pressing part of the vehicle sensor 400 makes contact with the fourth outer circumferential surface 634 of the second plate 620 of the integrated plate 600 so that the pressing part of the vehicle sensor 400 is separated from the one-directional gear teeth 320 of the flywheel gear 300.

Therefore, when the webbing 110, which has been withdrawn by the third length $l_3$, is introduced, the vehicle sensor 400 does not operate regardless of the inclination angle of the frame 200, so that the webbing 110 can be freely withdrawn or introduced. Accordingly, the user can make the seat back close to or further away from the seat if necessary without any difficulty.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A retractor for a seat belt comprising:
   a spool around which a webbing is wound;
   a frame rotatably coupled with the spool and receiving the webbing wound around the spool;
   a flywheel gear provided at a central portion thereof with a driving gear having an axis identical to a rotational axis of the spool, having one-directional gear teeth formed along an outer circumferential surface thereof, and mounted on one end of the spool to rotate together with the spool;
   a vehicle sensor locked with the one-directional gear teeth if the frame is inclined at a predetermined angle or more to prevent the webbing from being withdrawn;
   a lever locked with the one-directional gear teeth to prevent the webbing from being withdrawn while allowing the webbing to be introduced if the webbing has been withdrawn by a predetermined first length, and separated from the one-directional teeth to allow the webbing to be withdrawn and introduced if the webbing is introduced again so that the webbing is withdrawn by a predetermined second length after the webbing has been withdrawn by the first length; and
   an integrated plate including a driven gear operating together with the driving gear of the flywheel gear to rotate together with the spool and the flywheel gear, the integrated plate comprising a first plate adjusting the lever according to a withdrawn length of the webbing and a second plate integrated with the first plate as a step structure to determine an operation of the vehicle sensor according to the withdrawn length of the webbing.

2. The retractor of claim 1, wherein the first plate has a first outer circumferential surface making contact with the lever when the webbing is introduced again after the webbing has been withdrawn by the first length, and a second outer circumferential surface making contact with the lever when the webbing is introduced again after the webbing has been withdrawn by the second length, and
   wherein the first and second outer circumferential surfaces have radiuses different from each other, and
   wherein the first plate changes a position of the lever while rotating, so that the lever is locked with the one-directional gear teeth or separated from the one-directional gear teeth.

3. The retractor of claim 2, wherein the radius of the second outer circumferential surface is greater than the radius of the first outer circumferential surface,
   wherein the lever is locked with the one-directional gear teeth if the lever makes contact with the first outer circumferential surface, and
   wherein the lever is pushed outward from the flywheel gear if the first plate rotates to allow the second circumferential surface to make contact with the lever, so that the lever is separated from the one-directional gear teeth.

4. The retractor of claim 2, wherein the webbing is withdrawn by the first length when the lever is positioned at one side to connect the first outer circumferential surface with the second outer circumferential surface, and
   wherein the webbing is withdrawn by the second length when the lever is positioned at an opposite side to connect the first outer circumferential surface with the second outer circumferential surface.

5. The retractor of claim 4, wherein the first length of the webbing is a length when the webbing is completely withdrawn from the frame.

6. The retractor of claim 5, wherein the integrated plate further includes a reference point provided in the flywheel gear or a case surrounding the flywheel gear, so that the lever is positioned at the one side to connect the first outer circumferential surface with the second outer circumferential surface when the first length of the webbing is a length when the webbing is completely withdrawn from the frame.

7. The retractor of claim 1, wherein the second plate includes third and fourth outer circumferential surfaces making contact with the vehicle sensor,
   wherein the third outer circumferential surface allows the vehicle sensor to be locked with the one-directional gear teeth to prevent the webbing from being withdrawn from the frame when the frame is inclined at the predetermined angle or more, and
   wherein the fourth outer circumferential surface prevents the vehicle sensor from being locked with the one-directional gear teeth to allow the webbing to be withdrawn from the frame regardless of the inclination angle of the frame when the webbing is introduced into the frame after the webbing has been withdrawn by a predetermined third length.

8. The retractor of claim 7, wherein the fourth outer circumferential surface protrudes from the third outer circumferential surface to push the vehicle sensor making contact with the fourth outer circumferential surface outward from the flywheel gear so that the vehicle sensor is not locked with the one-directional gear teeth when the webbing is introduced into the frame after the webbing has been withdrawn by the predetermined third length.

9. The retractor of claim 1, further comprising a reduction gear having one side operating together with the driving gear of the flywheel gear and an opposite side operating together with the driven gear of the integrated plate to reduce a rotational ratio of the driven gear to the driving gear, so that a speed of revolution of the integrate plate is reduced more than a speed of revolution of the flywheel gear.

10. The retractor of claim 9, wherein the driven gear of the integrated plate forms an internal gear which is provided in a vicinity of a center of rotation of the integrated plate in opposition to the first to fourth outer circumferential surfaces and engaged with the opposite side of the reduction gear having a number of teeth smaller than a number of teeth of the one side of the reduction gear to rotate.

11. The retractor of claim 1, wherein the lever comprises:
   a body adjacent to the flywheel gear and the integrated plate;
   a first protrusion part protruding from the body and making contact with the first plate;
   a second protrusion part spaced apart from the first protrusion while protruding from the body and locked with the one-direction gear teeth when the webbing is withdrawn by the first length; and
   a position fixing part preventing the second protrusion part from being separated from the one-direction gear teeth due to external force occurring when the webbing is introduced after the second protrusion part has been locked with the one-directional teeth.

12. The retractor of claim 11, wherein the first protrusion part makes contact with the first outer circumferential surface of the first plate and the second protrusion part is locked with the one-directional gear teeth when the webbing is withdrawn by the first length, so that the webbing is not able to be withdrawn, and
   wherein the first protrusion part makes contact with the second outer circumferential surface of the first plate and the second protrusion part is separated from the one-directional gear teeth when the webbing is introduced again after the webbing has been withdrawn by the first length and the webbing is withdrawn by the second length, so that the webbing is able to be withdrawn again.

13. The retractor of claim 12, wherein the position fixing part forms a latch locked with a protrusion provided on the case surrounding the flywheel gear or the frame, and wherein the latch is locked with the protrusion after the second protrusion part has been locked with the one-directional gear teeth to prevent the second protrusion part from being separated from the one-directional gear teeth due to external force occurring when the webbing is introduced.

14. The retractor of claim 12, wherein the position fixing part forms an elastic member having one side connected with the frame or the case surrounding the flywheel gear and an opposite side connected with the first protrusion part or the second protrusion part, and wherein the elastic member applies elastic force to allow the second protrusion part to be directed toward the one-directional gear teeth to prevent the second protrusion part from being separated from the one-directional gear teeth due to external force occurring when the webbing is introduced.

15. The retractor of claim 14, wherein the lever further comprises a third protrusion part protruding from the body to prevent the first protrusion part from being separated from the first plate due to the elastic member.

16. The retractor of claim 13, wherein the frame or the case surrounding the flywheel gear is provided therein with a guide part to guide the second protrusion part to move toward the one-directional gear teeth or move away from the one-directional gear teeth.

* * * * *